June 24, 1924.

M. OLSEN

WEEDER

Filed Oct. 28, 1922      4 Sheets-Sheet 1

1,499,190

Mathias Olsen, INVENTOR.

BY Geo. P. Kimmel.

ATTORNEY.

June 24, 1924.

M. OLSEN

WEEDER

Filed Oct. 28, 1922

*Mathias Olsen*, INVENTOR.

BY *Geo. F. Kimmel.*

ATTORNEY.

June 24, 1924.
M. OLSEN
WEEDER
Filed Oct. 28, 1922  4 Sheets-Sheet 3
1,499,190
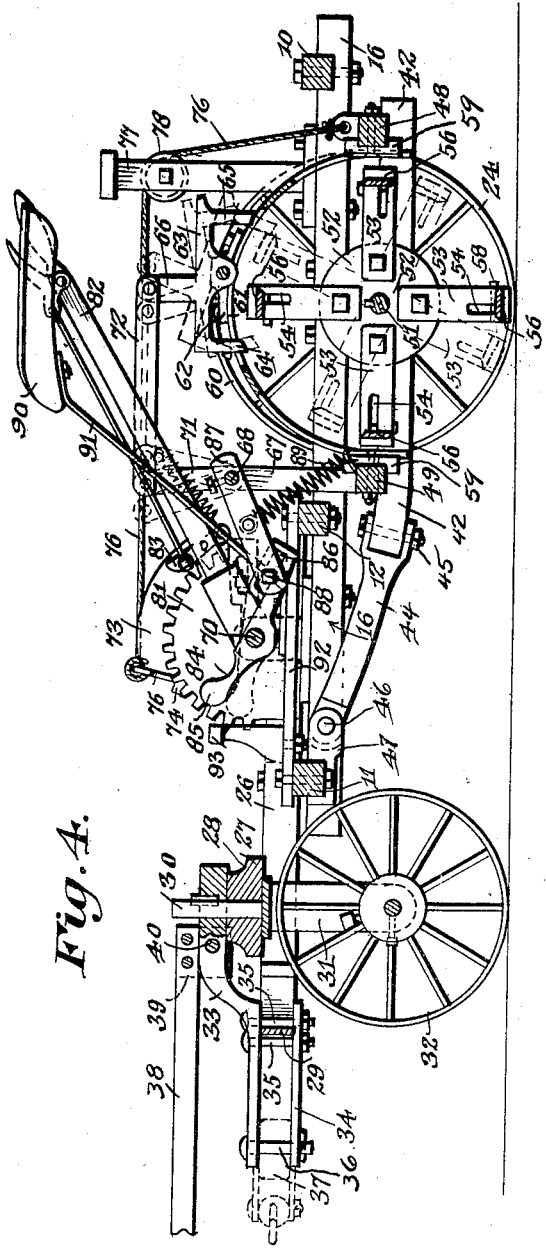
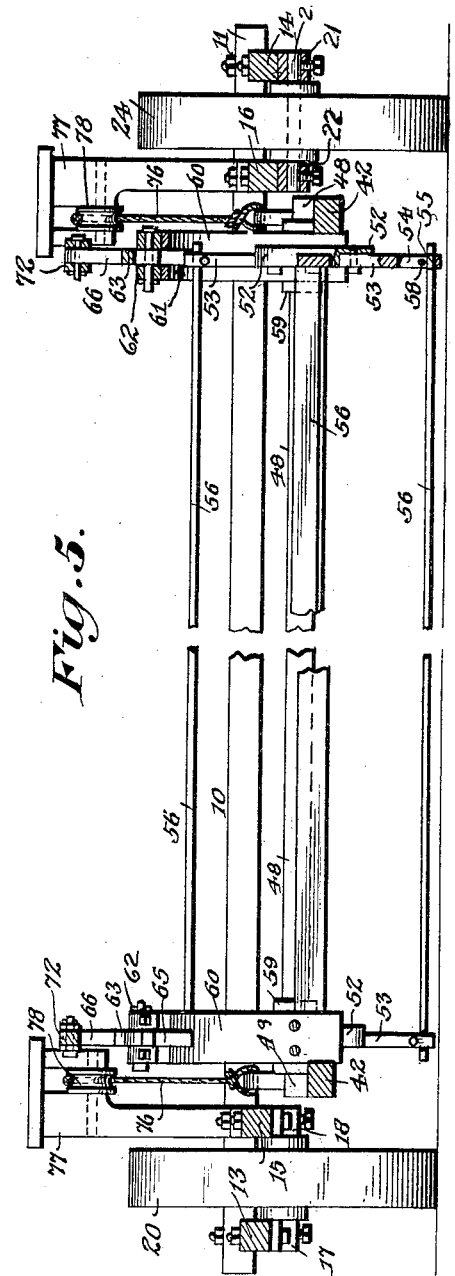
Mathias Olsen, INVENTOR.
BY Geo. F. Kimmel
ATTORNEY

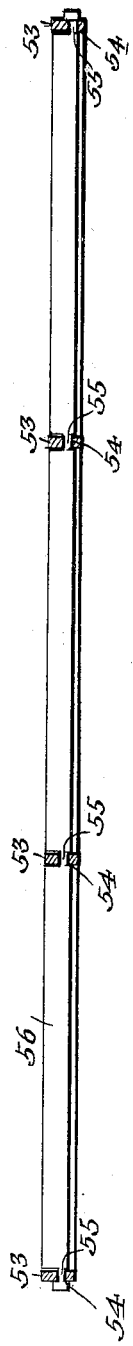
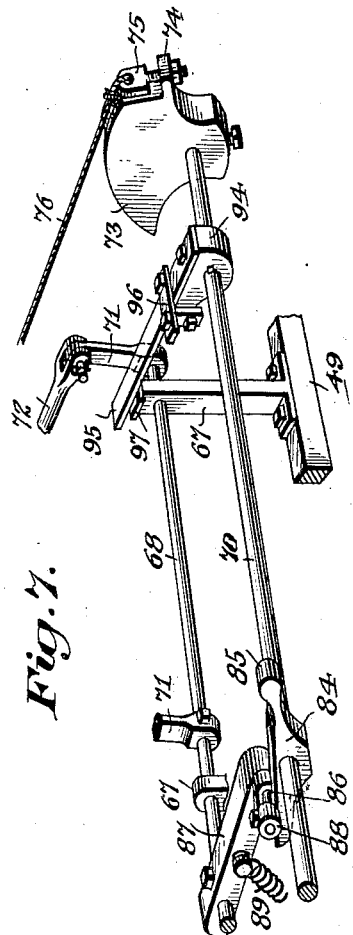
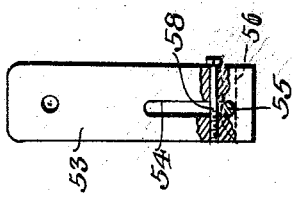
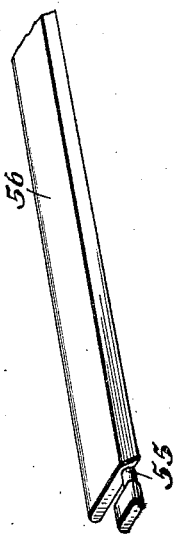

Patented June 24, 1924.

1,499,190

UNITED STATES PATENT OFFICE.

MATHIAS OLSEN, OF DUTTON, MONTANA.

WEEDER.

Application filed October 28, 1922. Serial No. 597,576.

*To all whom it may concern:*

Be it known that I, MATHIAS OLSEN, a citizen of the United States, residing at Dutton, in the county of Teton and State of Montana, have invented certain new and useful Improvements in Weeders, of which the following is a specification.

This invention relates to weeding apparatus and has for one of its objects to improve the construction and increase the efficiency and utility of devices of this character.

Another object of the invention is to provide a device of this character including a drum carrying a plurality of longitudinally directed freely swinging blades, and with means for locking the drum in position to hold the blades consecutively in operative position, and to permit the drum to rotate by contact with the soil, to bring another blade into operative position if a blade becomes clogged.

Another object of the invention is to provide a device of this character including a vertically swinging frame carrying a drum having a plurality of freely swinging weed severing blades, means for locking the drum to hold the lowermost blade in operative position, and yieldable means for holding the frame and drum in operative position.

Another object of the invention is to provide a device of this character including a supporting frame carrying a drum of weed eradicating blades, and with means for depressing the drum to control the depth of the action of the blades, or to elevate the drum when not in use, or when the apparatus is being transported.

Another object of the invention is to provide a device of this character including a machine carrying a drum having a plurality of longitudinally directed blades, and with means for locking the drum from movement when the machine is moved either forwardly or rearwardly.

With these and other objects in view, the invention consists in certain novel features of construction as hereinafter shown and described and then specifically pointed out in the claims, and in the drawings illustrative of the preferred embodiment of the invention.

Fig. 4 is a section on line 4—4 of Fig. 1.

Fig. 5 is a section on the line 5—5 of Fig. 2.

Fig. 6 is a detail of one of the floating weed eradicating blades.

Fig. 7 is a detail perspective view of portions of the operating mechanism.

Fig. 8 is an enlarged detail of one of the radiating blade supporting arms partly in section.

Fig. 9 is an enlarged perspective detail of one of the floating blades.

Figure 1:
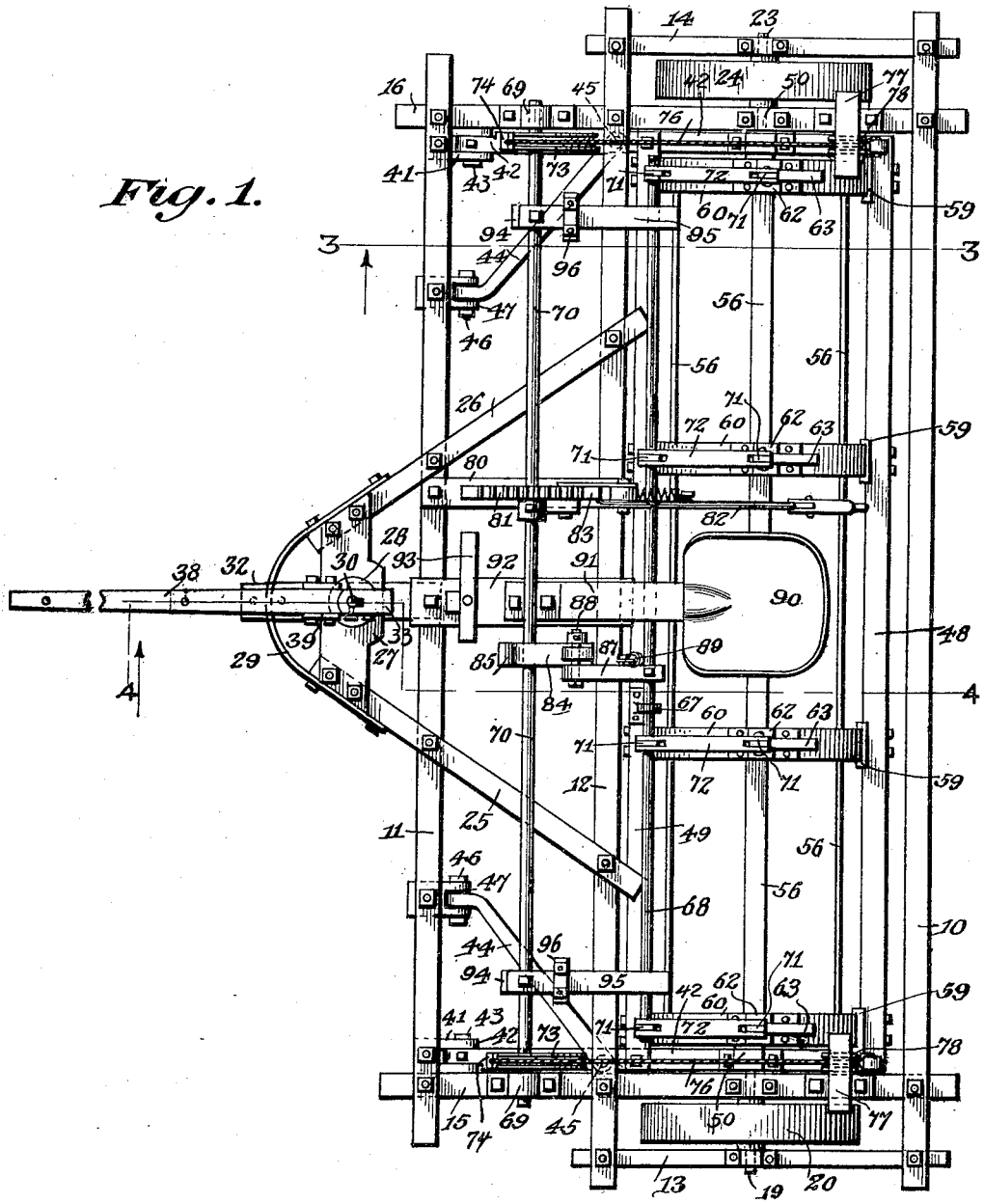
Fig. 1 is a plan view of the improved apparatus.
Figure 2:
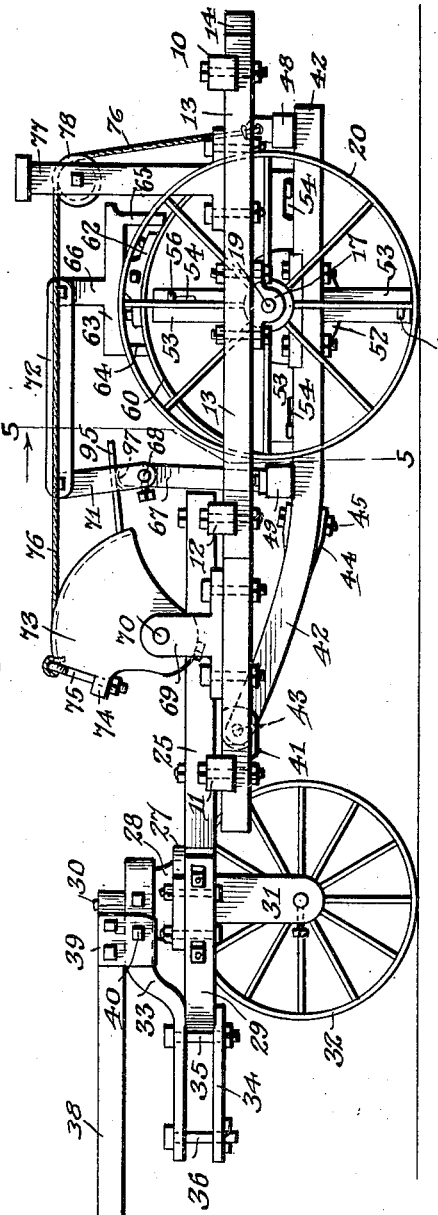
Fig. 2 is a side elevation.
Figure 3:
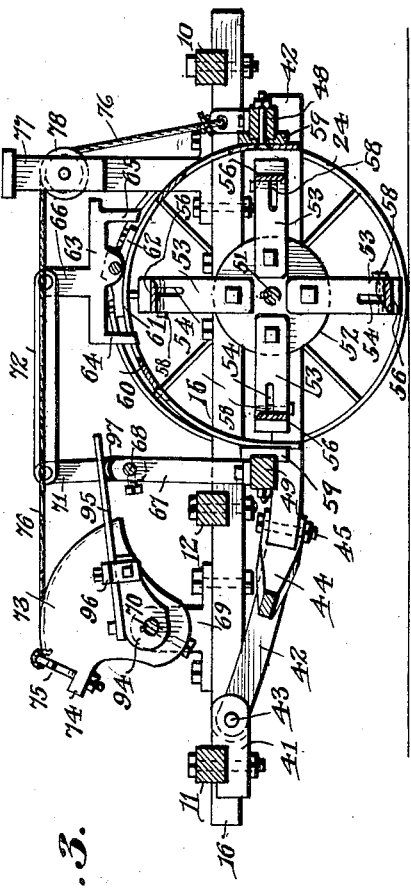
Fig. 3 is a section on line 3—3 of Fig. 1.

The improved device comprises in general a supporting frame mounted on carrier wheels, a drum movably supported relative to said frame and having a plurality of weed eradicating blades, with means for permitting the rotation of the drum and locking it in position with the lowermost blade in operative position, and to release the drum to permit the blades to automatically and consecutively assume an operative position, to relieve a clogged blade.

The supporting frame comprises a forward transversely directed member 11, rear transversely directed member 10, intermediate transverse member 12, outer longitudinal members 13 and 14 connected respectively at their ends to the rear member 10 and the intermediate member 12, and inner longitudinal members 15 and 16 connected at their ends respectively to the forward and rear members 10 and 11 and to the intermediate member 12, and spaced from the outer longitudinal members 13 and 14.

Depending from the transverse members 13 and 15 between the transverse members 10 and 12 are bearings 17 and 18 to support the axle or journal 19 of a bearing wheel 20, while similar bearings 21 and 22 depend respectively from the frame members 14 and 16 and support the journal or axle 23 of a bearing wheel 24.

Attached respectively to the forward and intermediate frame members 10 and 12 are obliquely arranged supporting bars 25 and 26 extending in advance of the forward frame member 11 and connected at their forward ends by a supporting plate 27, the latter having a central aperture surrounded by a supporting "boss" 28.

The forward ends of the bars 25 and 26 are further supported by a segmental band 29, the central portion of the band being concentric to the central aperture of the base member 27 and its "boss" 29, as shown in Fig. 1.

Extending through the aperture of the plate 27 and its "boss" 28, is the stud or journal 30 of a yoke member 31, the latter carrying a caster or "truck" wheel 32.

Coupled to the stud 30 is an arm 33 extended forwardly and downwardly and bearing upon the upper edge of the segmental portion of the band 29. Bearing beneath the segmental portion of the band is a clamp plate 34, and coupled to the member 33 in spaced relation thereto by pins 35 at opposite sides of the segmental portion of the band 29. By this means the member 33 is free to swing with the stud 30 to which it is keyed, or otherwise attached, and thus applies the swinging motion to the caster wheel.

At their forward ends the members 33 and 34 detachably support another pin 36 which constitutes the pivot or "king" pin to a double tree or evener beam, indicated by dotted lines at 37 in Fig. 4.

The draft tongue of the improved device is represented at 38 and is provided with a perforated plate 39 attached to its sides at the inner end and mounted to swing vertically on a pin 40 extending transversely through the member 33. By this means the draft tongue and the "truck" are coupled to operate together horizontally, but the draft tongue is also capable of vertical movement independently of the swinging or lateral movement of the "truck."

Attached to the forward frame member 11 near the ends are block devices 41 in which bars 42 are pivoted at 43 to swing vertically and with suitable braces 44 coupled respectively at one end at 45 to the bars 42 and pivoted at their other ends at 46 in block devices 47 attached to the frame member 10 and spaced from the blocks 41, as shown in Fig. 1.

Connected at its ends to the rear ends of the bars 42 is a longitudinally directed member 48, and likewise connected to the bars 42 intermediate their ends is another and similar bar 49.

Attached to the bars 42 midway between the members 48 and 49 are bearings 50 in which a shaft 51 is mounted for rotation, and mounted on the shaft just within the bars 42 and at a plurality of points intermediate the bars, are disk hubs 52, each hub having radially directed arms 53, four for each hub for illustration.

At its outer end each of the arms 53 is provided with a longitudinally directed slot 54 in which journals 55 formed on the weed engaging blades 56 are mounted for rotation, each blade having one knife edge.

The journals 55 of the blades 56 are spaced from the ends and located at one side of the centers of the blades, at intermediate points, or where the arms 53 are located.

The blades are held from displacement in the slot by stop pins 58. The slots 54 permit the blades to be "threaded" through the arms 53 until the journals 55 of the blades are located respectively in the slots, and then by inserting the pins 58 through the arms, the blades can not be displaced while at the same time free to rotate on their journals.

Attached to the confronting faces of the members 48 and 49 at points opposite the hubs 52 and arms 53 are holding plates 59, and attached to each set of the holding plates is a supporting guard member 60, preferably curved as shown substantially concentric to the paths of the blades 56.

Formed in each of the guard members 60 is a longitudinally directed slot 61, and attached to each of the guard members at each side of the slots 61 are bearings 62 to swingingly support rocker arms 63, each arm having downturned ends 64 and 65 operating through the slots of the members 60.

Rising from the member 49 at spaced intervals are standards 67 having bearings in their upper ends to support a rock shaft 68, and rising from the members 15 and 16 are standards 69 supporting another rock shaft 70.

Attached to the rock shaft 68 at points opposite each of the rocker arms 63 is another arm 71, each of the latter being coupled by a link 72 to an extension 66 on rocker arms 63. By this means the rocking of the shaft 68 will impart a corresponding rocking motion to the rocker arms 63 and the down-turned terminals 64 and 65 carried thereby, as hereafter more fully described.

Attached to the rock shaft 70 near the ends are grooved segments 73 each having a lug 74 extending therefrom and each lug carrying an eye bolt 75. Connected to each eye bolt is a pull cable 76 which passes respectively over the grooved segments 73 and is attached at the other ends to the member 48 near the ends. Rising from the frame members 15 and 16 are standards 77 carrying guide sheaves 78 over which the pull cables 76 lead, as shown.

By this arrangement when the shaft 70 is rocked, the drum carrying frame will be elevated or depressed, to bring the blades 56 into engagement with the ground or elevated clear of the ground, as required.

Extending over the frame members 11 and 12 is a bar 80, and attached to the bar is a toothed segment 81, and attached at one end to the rock shaft 70 is an operating lever 82 having a pawl device 83 engageable with the teeth of the segment. By this means the shaft 70 may be rocked to any required extent to control the position of the drum device.

Mounted to rotate freely on the rock shaft 70 is a treadle 84 having a foot engageable enlargement 85 at one end and a longitudinally directed slot 86 at the other end.

Attached to the rock shaft 68 is an arm 87 having a lateral pin 88 extending through the slot 86, as shown, and attached to the arm 87 is a spring 89 operating to hold the slotted end of the treadle yieldably in its lower position.

The driver's seat is represented at 90 and mounted by a yieldable standard 91 upon a base member 92 attached to the frame members 11 and 12.

A foot rest 93 is also attached to the base member.

Attached to the rock shaft 70 at points opposite the outer standards 67 are supports 94 to which yieldable stop arms 95 are rigidly attached as by clips 96, and extending over the upper ends of the adjacent standards 67, the latter being extended above the rock shaft 68 as shown at 97 to receive the spring arms.

The spring arms operate to yieldably hold the drum carrying frame in its lower position, and prevent the frame and drum from being moved upwardly under normal conditions of the soil, but will yield when abnormal obstructions are encountered by the blades.

When not in use, or when being transported, the operating lever 82 will be turned to a substantially vertical position to cause the grooved segments 73 to exert a pulling force upon the pull cables 76 and thus elevate the drum frame and the drum of weed engaging blades carried thereby, and at the same time elevate the spring arms 95 clear of the standards 67—97, so that they do not interfere with the elevation of the drum.

When the weeder is to be employed, the operating lever 82 is depressed to release the strain on the pull cables 76 and permit the drum frame to move downwardly by gravity and thus dispose the lowermost blade 56 in position to engage the ground as the apparatus is moved forwardly by the tractive force, or to be held at intermediate points of elevation within the range of the notched segment 81 and the pawl 83 as will be obvious.

At the same time that the operating lever 82 is actuated to rock the shaft 70, the spring arms 95 will be engaged with the standards 67—97 to hold the drum yieldably in operative position, as before explained.

The blade 56 which for the time bing is in the lowermost position is thus caused to move through the ground while the remaining blades are idle, or inactive.

So long as the lower or operative blade 56 runs freely through the soil, the arms 87 will hold the drum from rotation, but if the operative blade becomes clogged with weeds, which is very liable to happen, the driver presses the forward end 85 of the treadle lever 84 downwardly to elevate the slotted end and correspondingly elevate the arm 87 against the resistance of the spring 89 and thus rock the shaft 68 and cause the members 63 to be tilted on their pivots and withdraw the stops or projections 64 from the paths of the arms 53, and permit the drum to be rotated by contact with the ground and thus carry the clogged blade rearwardly and upwardly and move the next unclogged blade to the lower position, and when the pressure on the treadle is removed the spring 89 will return the stop 64 into lower position into the path of the arm 53 which for the time being is uppermost, and thus check the rotation of the drum and hold the unclogged blade in lower operative position.

This action can be repeated as many times as there are blades, as will be obvious.

Generally when the clogged blade is disposed in its elevated and inoperative position, the weeds caught thereby will fall from the blade or be shaken therefrom by the forward motion of the apparatus, but if not the clogged blades can be easily cleared manually of the clogging weeds.

It will be noted that when the drum is released by pressure applied to the treadle, and the treadle be held downwardly, the rear stop 65 will hold the drum from rotating so that two of the blades will be in operative position and if held in that position for a short time the space of ground between the two "active" blades will be acted on, and thus leave no gaps or untreated ground.

The improved device may be constructed of any suitable material and any size or capacity and will be found especially applicable where a summer tilling of land is practiced, to eradicate the weeds or prevent their growth, especially in fields which are being summer fallowed or summer tilled.

The preferred embodiment of the invention is disclosed in the drawings and set forth in the specifications, but it will be understood that modifications within the scope of the claims may be made in the construction without departing from the principle of the invention or sacrificing any of its advantages.

Having thus fully described the invention what is claimed as new is:

1. In an apparatus of the class described, a main frame supported on carrier wheels, a supplemental frame swinging vertically at its forward end upon said main frame, a drum device including a plurality of radiating arms and rotatively supported by said swinging frame, weed eradicating blades carried respectivley by said arms, a plurality of rocker arms mounted to swing relatively to said supplemental frame and each with spaced downturned ends adapted to be alternately moved into the paths of said blades, and means for actuating said rocker arm to hold the blades from forward or rearward movement.

2. In an apparatus of the class described, a main frame supported on carrier wheels, a supplemental frame pivoted to swing vertically at its forward end upon said main frame, a drum device including a plurality of radiating arms and rotatively supported by said swinging frame, weed eradicating blades carried respectively by said arms, means for swinging said movable frame on its pivot and holding it in adjusted position, and means for locking said drum device from rotation to hold said blades consecutively in operative position.

3. In an apparatus of the class described, a main frame supported on carrier wheels, a supplemental frame movably coupled to said main frame, a drum device including a plurality of radiating arms and rotatively supported by said movable frame, weed eradicating blades carried respectively by said arms, a lever arm swinging relatively to said drum device and having a downturned terminal adapted to project into the paths of said arms, a rock shaft mounted on said movable frame and carrying a lever arm, a link connecting the lever arm of the rock shaft with the swinging lever arm, and means for actuating said rock shaft.

4. In an apparatus of the class described, a main frame supported on carrier wheels, a supplemental frame movably coupled to said main frame, a drum device including a plurality of radiating arms and rotatively supported by said movable frame, weed eradicating blades carried respectively by said arms, a lever arm swinging relatively to said drum device and having a downturned terminal adapted to project into the paths of said arms, a rock shaft mounted on said movable frame and carrying a lever arm, a link connecting the lever arm of the rock shaft with the swinging lever arm, a treadle device movably supported on the main frame, and coupling means between the treadle device and the rock shaft, whereby the swinging lever arm is operated.

5. In an apparatus of the class described, a main frame supported on carrier wheels, a supplemental frame movably coupled to said main frame, a drum device including a plurality of radiating arms and rotatively supported by said movable frame, weed eradicating blades carried respectively by said arms, a slotted band connected to said movable frame and extending over said radiating arms, a lever arm swinging on said band and having downturned ends extending through the slot of the same and into the paths of the radiating blade carrying arms, and means for actuating said lever arm to cause the downturned terminals to lock the drum from rotation and hold said blades consecutively from rotation.

6. In an apparatus of the class described, a main frame supported on carrier wheels, a supplemental frame swinging vertically at its forward end upon said main frame, a drum device including a plurality of radiating arms and rotatively supported by said swinging frame, weed eradicating blades carried respectively by said arms, means for locking said drum device from rotation to hold said blades consecutively in operative position, a rock shaft mounted on said main frame, a segment carried by said rock shaft, a pull cable connected to the free end of said swinging frame, and means for actuating said rock shaft, whereby the position of the swinging frame is controlled.

7. In an apparatus of the class described, a main frame supported on carrier wheels, a supplemental frame swinging at one end upon said main frame, a drum device including a plurality of radiating arms and rotatively supported by said swinging frame, weed eradicating blades carried respectively by said arms, means for locking said drum device from rotation to hold said blades consecutively in operative position, means applied to the free end of said swinging frame for swinging the same on its pivot to control the depth of the action of said blades, and yieldable means for holding the free end of said swinging frame in its lowered position.

8. In an apparatus of the class described a main frame supported on carrier wheels, a supplemental frame movably coupled to said main frame, a drum device including a plurality of radiating arms and rotatively supported by said movable frame, weed eradicating blades carried respectively by said arms, means for locking said drum device from rotation to hold said blades consecutively in operative position, a rock shaft mounted on said main frame, a segment carried by said rock shaft, a pull cable connected at one end to said segment and at the other end to said movable frame, and a yieldable member carried by said rock shaft and extending for engagement with said movable frame and operating to hold said movable frame yieldably in its lowered position.

9. In an apparatus of the class described, a main frame supported on carrier wheels, a supplemental frame movably coupled to said main frame, a drum device including a plurality of radiating arms and rotatively supported by said movable frame, weed eradicating blades carried respectively by said arms and adapted to be held consecutively in operative position, a support carried by said main frame, a caster wheel supported for rotation relative to said support and including a yoke frame and a pivot member, a segmental band attached to said main frame, an arm connected to said yoke pivot member and bearing over said band, means for coupling said arm for movement upon said band, and means for coupling a draft appliance to said swinging arm.

10. In an apparatus of the class described, a main frame supported on carrier wheels, a supplemental frame movably coupled to said main frame, a drum device including a plurality of radiating arms and rotatively supported by said movable frame, weed eradicating blades carried respectively by said arms and adapted to be held consecutively in operative position, a support carried by said main frame, a caster wheel supported for rotation relative to said support and including a yoke frame and a pivot member, a segmental band attached to said main frame, an arm connected to said yoke pivot member and bearing over said band, means for coupling said arm for movement upon said band, means for coupling a draft appliance to said swinging arm, and a draft tongue connected to swing vertically relatively to said arm.

In testimony whereof, I affix my signature.

MATHIAS OLSEN.